(12) United States Patent
Kalenski

(10) Patent No.: US 11,865,979 B2
(45) Date of Patent: Jan. 9, 2024

(54) REUSABLE PROTECTIVE PANELS FOR VEHICLES

(71) Applicant: MEK Magnet, San Diego, CA (US)

(72) Inventor: Monika Kalenski, San Diego, CA (US)

(73) Assignee: MEK Magnet, San Diego, CA (US)

( * ) Notice: Subject to any disclaimer, the term of this patent is extended or adjusted under 35 U.S.C. 154(b) by 134 days.

(21) Appl. No.: 17/669,981

(22) Filed: Feb. 11, 2022

(65) Prior Publication Data

US 2022/0258681 A1    Aug. 18, 2022

Related U.S. Application Data

(60) Provisional application No. 63/150,620, filed on Feb. 18, 2021.

(51) Int. Cl.
| | |
|---|---|
| *B60R 13/04* | (2006.01) |
| *B60S 1/66* | (2006.01) |
| *B60R 19/42* | (2006.01) |

(52) U.S. Cl.
CPC ............... *B60R 13/04* (2013.01); *B60S 1/66* (2013.01); *B60R 19/42* (2013.01)

(58) Field of Classification Search
CPC ............ B60R 13/04; B60R 19/42; B60S 1/66
See application file for complete search history.

(56) References Cited

U.S. PATENT DOCUMENTS

| | | | | |
|---|---|---|---|---|
| 5,544,458 | A  * | 8/1996 | Fisher ................. | B60J 1/10 52/204.591 |
| 2003/0057729 | A1* | 3/2003 | Morris ................. | B60R 13/04 296/136.05 |
| 2004/0028937 | A1* | 2/2004 | Egashira ............. | B32B 15/08 428/626 |
| 2004/0124661 | A1* | 7/2004 | Gentile ............... | B60R 19/44 296/136.08 |
| 2009/0074994 | A1* | 3/2009 | McLean .............. | B60R 13/04 428/31 |
| 2012/0237725 | A1* | 9/2012 | Stossel ............... | B29C 45/14811 156/221 |
| 2014/0367040 | A1* | 12/2014 | Traser ................ | C08F 220/1818 428/305.5 |
| 2015/0048607 | A1* | 2/2015 | Patelczyk ............ | B60R 19/24 280/770 |
| 2015/0268003 | A1* | 9/2015 | Bazinski ............. | F41H 3/00 428/187 |
| 2017/0057430 | A1* | 3/2017 | Kim ................... | H02S 30/10 |
| 2017/0113530 | A1* | 4/2017 | Schmidt .............. | B60R 13/04 |
| 2018/0244139 | A1* | 8/2018 | Kalenski ............. | B60J 11/06 |
| 2019/0112698 | A1* | 4/2019 | Hu ..................... | C23C 14/3442 |
| 2020/0198256 | A1* | 6/2020 | Baigh ................. | B62D 27/026 |
| 2020/0208271 | A1* | 7/2020 | Iwano ................. | C23C 28/30 |

(Continued)

*Primary Examiner* — Gregory A Blankenship
(74) *Attorney, Agent, or Firm* — Fish & Richardson P.C.

(57) ABSTRACT

A protective vehicle panel includes a protective film configured to prevent damage to an exterior panel of a vehicle; and a gel adhesive coating adhered to a first side of the protective film and configured to adhere to the exterior panel of the vehicle. The gel adhesive has a higher peel force to the protective film than to the exterior panel of the vehicle, and wherein a shear adhesion of the gel adhesive is higher than the peel force of the gel adhesive to the protective film. The protective vehicle panel is shaped and dimensioned to match a shape and dimension of the exterior panel of the vehicle.

21 Claims, 7 Drawing Sheets

(56) References Cited

U.S. PATENT DOCUMENTS

| | | | |
|---|---|---|---|
| 2020/0262335 A1* | 8/2020 | Hawkins | G02B 6/0011 |
| 2021/0078395 A1* | 3/2021 | Chen | B60J 11/06 |
| 2022/0258681 A1* | 8/2022 | Kalenski | B60R 13/04 |
| 2022/0332263 A1* | 10/2022 | Goerse | B60R 13/005 |
| 2023/0070911 A1* | 3/2023 | Lecky | B60R 19/42 |

* cited by examiner

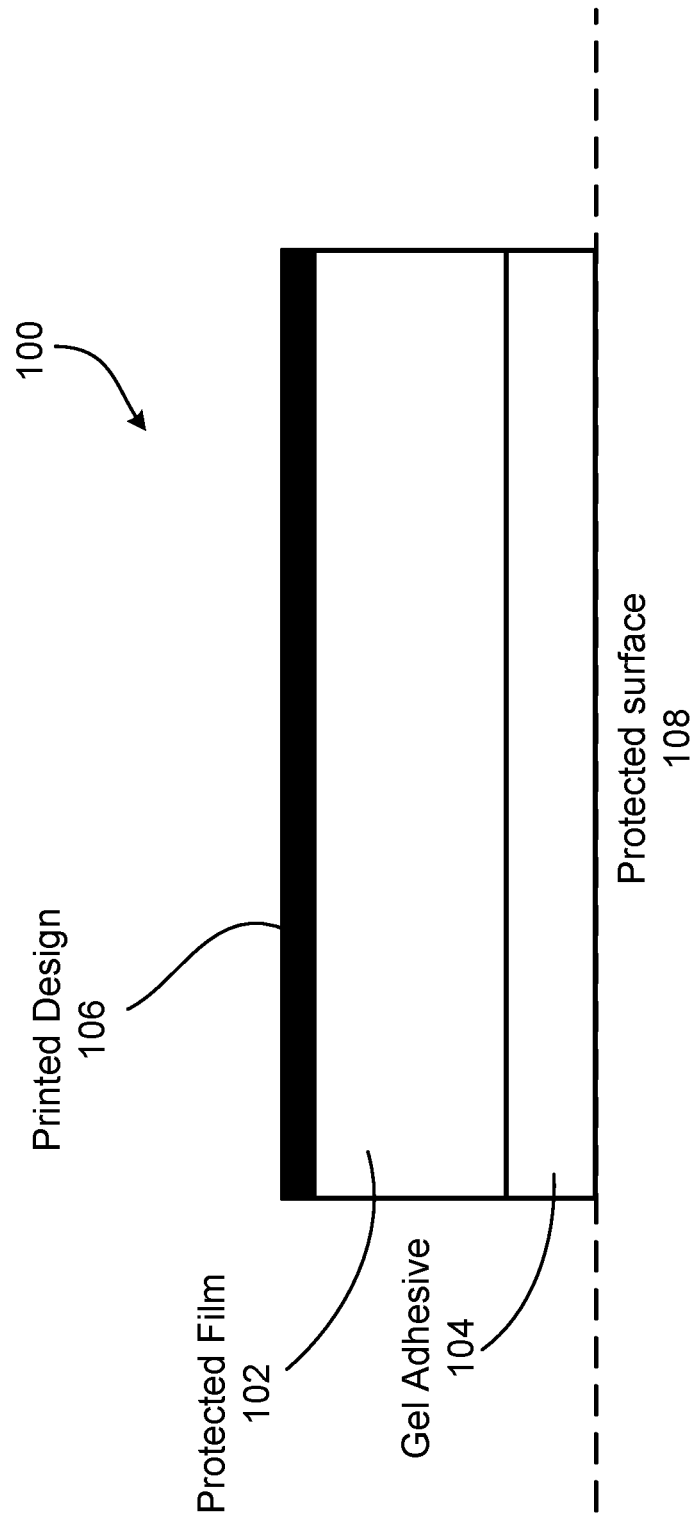

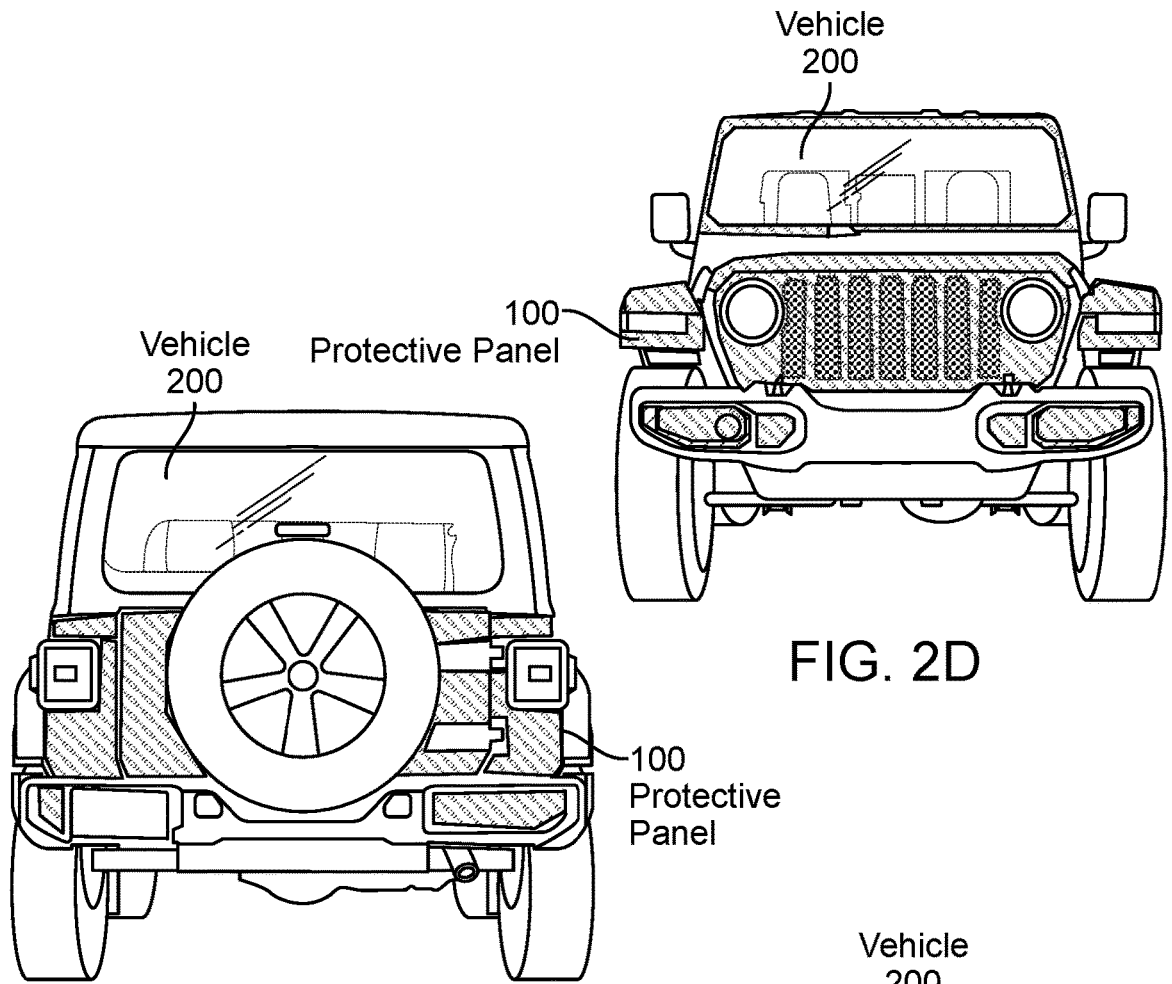
FIG. 2D
FIG. 2E
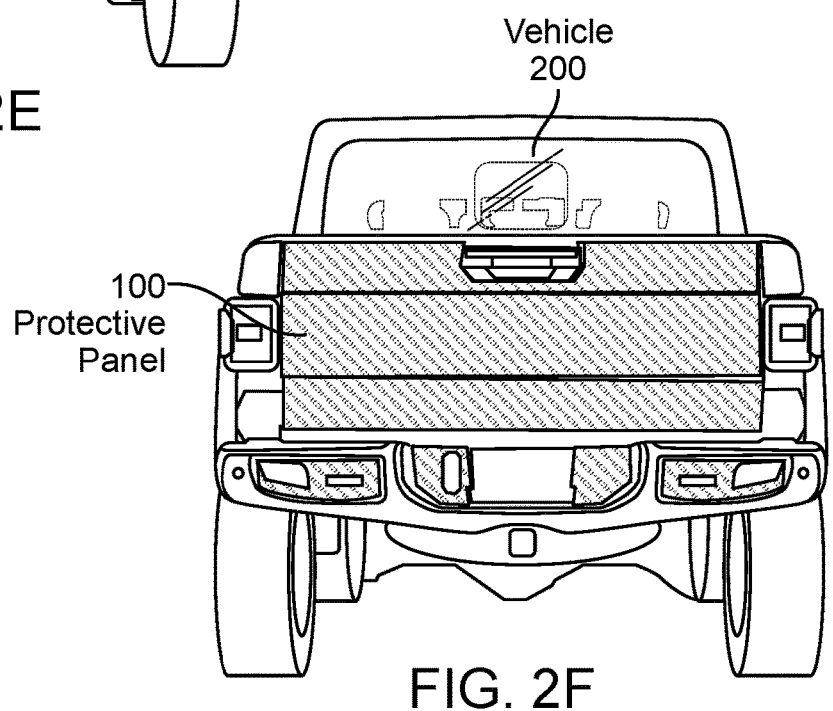
FIG. 2F

REUSABLE PROTECTIVE PANELS FOR VEHICLES

CLAIM OF PRIORITY

This application claims priority to U.S. Provisional Patent Application No. 63/150,620 filed on Feb. 18, 2021, the contents of which are incorporated here by reference in their entirety.

BACKGROUND

Exterior surfaces of a vehicle can be protected using vinyl wrapping applied to the surfaces, or by magnetically attaching a protective panel to the surfaces to be protected.

SUMMARY

The present disclosure encompasses systems, methods, and an apparatus for providing protective panels for use on a vehicle or other surface.

In an aspect, a protective vehicle panel includes a protective film configured to prevent damage to an exterior panel of a vehicle; and a gel adhesive coating adhered to a first side of the protective film and configured to adhere to the exterior panel of the vehicle. The gel adhesive has a higher peel force to the protective film than to the exterior panel of the vehicle. A shear adhesion of the gel adhesive is higher than the peel force of the gel adhesive to the protective film. The protective vehicle panel is shaped and dimensioned to match a shape and dimension of the exterior panel of the vehicle.

Embodiments can include one or any combination of two or more of the following features.

The gel adhesive coating includes one or more of a polyurethane gel adhesive, an acrylic gel adhesive, a silicone gel adhesive.

The protective film includes at least one of polyethylene terephthalate (PET) resin; polycarbonate film (PC30); aluminum; steel; rubber; or carbon fiber.

The protective panel has length of at least 0.5 meters in a first dimension, and 0.15 meters in a second dimension, wherein the second dimension is perpendicular to the first dimension.

The protective panel includes heating circuitry disposed on or embedded in the protective panel.

The protective panel includes lighting circuitry disposed on or embedded in the protective panel.

The PU gel adhesive has a peel force to the exterior panel that is greater than about 200 grams, e.g., greater than about 800 grams or greater than about 2000 grams. In some cases, the gel adhesive maintains the peel force to the exterior panel in a temperature range of between −40° C. and about 220° C.

The gel adhesive has a shear adhesion of 40 hours when a 1-inch square area of adhesive is tested with a 1 kg weight.

The protective film has a thickness in the range of 0.2 to 1 mm, and the gel adhesive coating has a thickness in the range of 2 microns and 550 microns.

The protective panel includes a printed design on a second side of the protective film opposite the first side. In some cases, the printed design includes luminescent paint.

In an aspect, a method of manufacturing a protective panel, the method includes pre-treating a protective film by cleaning a surface of the protective film, corona treating the surface of the protective film, or both, the protective film being configured to prevent damage to an exterior panel of a vehicle; applying an adhesive material to the pre-treated surface of the protective film to form a gel adhesive coating on the protective film, wherein the gel adhesive coating is configured to have a higher peel force to the protective film than to the exterior panel of the vehicle, and wherein a shear adhesion of the gel adhesive coating is higher than the peel force of the gel adhesive coating to the protective film; disposing a cover film over the gel adhesive coating; and cutting the protective film with the gel adhesive coating formed thereon into a protective panel shaped and dimensioned to match a shape and dimension of the exterior panel of the vehicle.

Embodiments can include one or any combination of two or more of the following features.

Applying the adhesive material to the surface of the protective film includes spraying coating liquid adhesive material onto the surface of the protective film.

Applying the adhesive material to the surface of the protective film includes transfer coating the gel adhesive coating onto the protective film from a release treated carrier substrate.

Applying the adhesive material to the surface of the protective film includes extrusion coating the adhesive material onto the surface of the protective film.

In an aspect, a method for protecting an exterior panel of a vehicle includes contacting a protective panel to the exterior panel to adhere the protective panel to the exterior panel, wherein the protective panel is shaped and dimensioned to match a shape and dimension of the exterior panel of the vehicle. The protective panel includes a protective film protective film configured to prevent damage to the exterior panel of the vehicle; and a gel adhesive coated on a side of the protective film and configured to adhere to the exterior panel of the vehicle, wherein the gel adhesive has a higher peel force to the protective film than to the exterior panel of the vehicle, and wherein a shear adhesion of the gel adhesive is higher than the peel force of the gel adhesive to the protective film.

Embodiments can include one or any combination of two or more of the following features.

The method includes removing the protective panel from the vehicle; washing the gel adhesive of the protective panel; and disposing a cover film over the washed PU gel adhesive. In some cases, the method includes removing the cover film from the gel adhesive; and re-adhering the protective panel to the exterior panel of the vehicle.

The details of these and other aspects are set forth in the accompanying drawings and the description below. Other features, objects, and advantages will be apparent from the description and drawings, and from the claims.

DESCRIPTION OF DRAWINGS

FIGS. 1A and 1B illustrate cross-sectional views of an example protective panel.

FIGS. 2A-2F illustrate protective panels on the exteriors of vehicles.

DETAILED DESCRIPTION

Figure 1B:
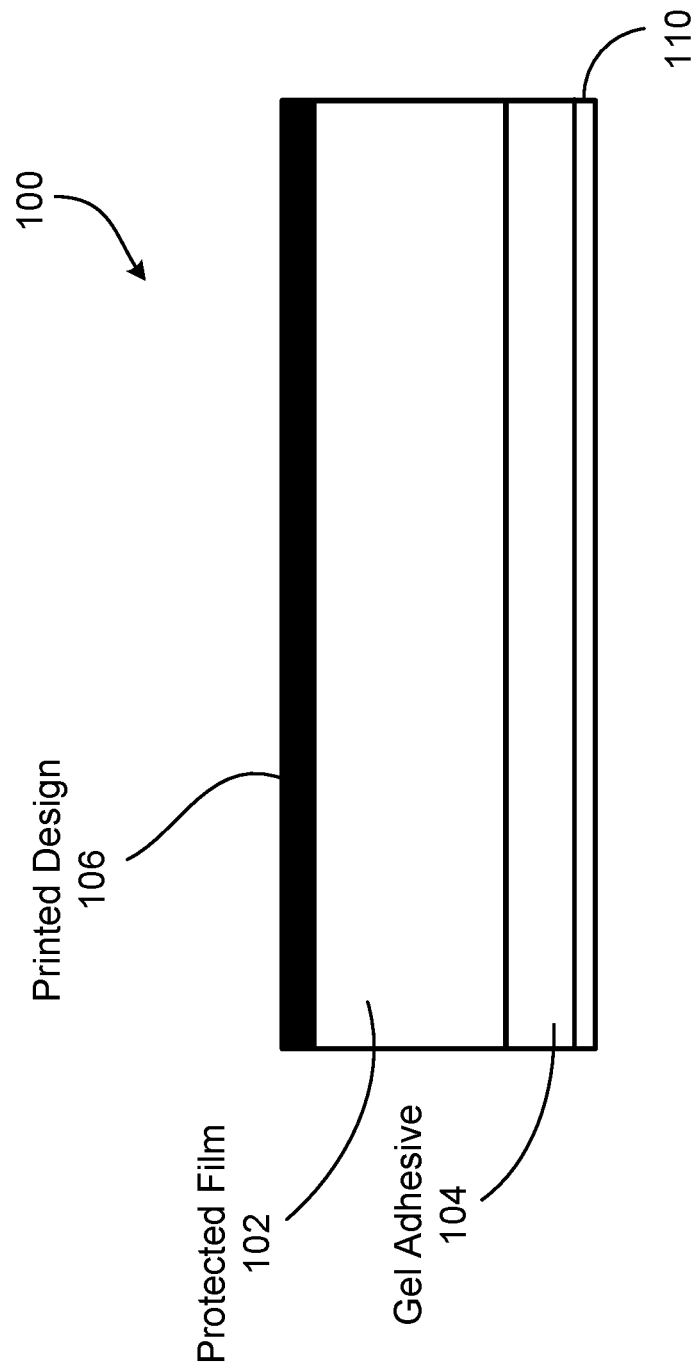

This disclosure describes reusable protective panels that can be repeatedly applied to and removed from a surface, such as an exterior or interior surface of a vehicle, to protect the surface, e.g., against scratches or dents. For example, many off-road vehicles are at risk of exterior damage when used off-road. To mitigate this risk, protective panels can be applied to exterior surfaces of a vehicle, thereby protecting the exterior paint and structure of the vehicle. The panels can be removed, e.g., when the vehicle is not used in an off-road environment, to wash the vehicle, or for other reasons, and then reapplied when desired. In some examples, the protective panels are also decorative, and panels can be applied or removed as desired to achieve a desired visual appearance.

The approaches described here can have one or more of the following advantages. The protective panels are easily installed on a surface, e.g., a vehicle surface, without specialized equipment. Moreover, the panels can be readily removed from the surface without damage to either the surface or to the panels themselves, allowing the panels to be reused multiple times. The protective panels described here are able to be applied to various types of surfaces, e.g., magnetic or non-magnetic surfaces; surfaces of metal, polymer, ceramic, or other materials; surfaces having a curvature; or other suitable surfaces. The protective panels described here adheres to the surface with sufficient strength that the protective panel will not become detached from the surface due to ordinary forces expected during regular use of the surface. For instance, the protective panels remain attached to an exterior vehicle surface even in the face of wind (e.g., airflow on the exterior of a vehicle at highway speeds) or lateral contact forces (e.g., water, mud, or branches scraping along the side of a vehicle).

The protective panels described here can be applied to various types of vehicles, such as road vehicles, off-road vehicles, or non-land-based vehicles. For instance, the protective panels can be applied to Jeeps, all-terrain vehicles (ATVs), snowmobiles, dirt bikes, motorcycles, racing cars, trailers, campers or recreational vehicles (RVs), boats, aircraft, or other vehicles. The protective panels can be applied to non-vehicle surfaces such as helmets, protective armor, windows, or other surfaces. The protective panels can be used as tool covers, reusable decals or accessories, protection for manufacturing equipment, drawer liners, appliance covers, counter covers, cabinet covers, tool box covers, or covers for other surfaces that can benefit from protection, e.g., painted, tiled, or enameled surfaces. In some examples, the protective film can have a decorative role in addition to or instead of a protective role. For instance, the protective film can be applied to a vehicle to display a race number on the vehicle; to a vehicle, wall, window, floor, or other surface to display, e.g., business signage or advertising; to a table surface; or to other surfaces.

FIG. 1A illustrates a cross-sectional view of an example protective panel 100 adhered to a surface 108 to be protected, such as an exterior surface of a vehicle. The protective panel 100 includes a protective film 102 that is coated with a gel adhesive 104. The gel adhesive 104 adheres to a surface 108 to be protected, thereby affixing the protective panel 100 to the protected surface 108. When the protective panel 100 is adhered to a surface 108, the panel 100 protects the surface 108 from damage. For example, a rock incident on the surface 108, which would normally strike and scratch the surface 108, will instead strike the protective film 102, which absorbs the energy of the impact, protecting the surface below. In some examples, a design 106 (e.g., a printed, etched, affixed, embedded, embossed, etc. design) can be included on a surface of the protective film 102, e.g., on the surface that is not coated with the gel adhesive 104, or embedded within the protective film 102.

In some examples, the protective film 102 is a polyester resin film such as PET or other thermoplastic polyester resin, a polycarbonate film such as PC30, or other suitable material. In some examples, the protective film 102 is a carbon fiber material, a metal sheet (e.g., aluminum, steel, or other suitable metal), or a rubber sheet, among other things. In some examples, the protective film 102 is formed of cloth, vinyl, glass, ceramic, or other protective material.

The thickness and materials properties (e.g., hardness and toughness) of the protective film 102 contributes to its ability to protect the surface 108 from scratches or abrasion. In some examples, the protective film 102 is in the range of 0.2 mm to 2 mm thick, e.g., between about 0.2 mm to 1 mm thick, e.g., about 0.33 mm thick.

In some examples, e.g., where the protective film 102 is a PET or polycarbonate material, the protective film can be transparent, or translucent. In some implementations the protective film 102 is colored, or provides a colored tint. In some examples, the protective film 102 includes additional features, such as embedded circuitry to provide heating or lighting, sensors (e.g., sensors to detect contact, temperature sensors, moisture sensors, or other types of sensors).

In a specific example, the protective film 102 is a polycarbonate film having a tensile strength and ultimate elongation (as measured according to ISO 527-1,2) of 60 MPa and >90%, respectively; a bending strength (as measured according to ISO 178) of 90 MPa, and a beam impact strength (as measured according to ISO 179-1) of 80 KJ/m$^2$.

The gel adhesive 104 is an adhesive that has a higher adhesion (e.g., peel force) to the protective film 102 than to the surface 108, and that has a higher cohesive strength (shear) than the adhesion (peel force) of the adhesive to the surface 108. Thus, when a peel force is applied to the protective panel 100 (e.g., by a user lifting a corner of the panel), the adhesion between the adhesive 104 and the surface 108 is broken before the adhesion between the adhesive 104 and the protective film 102, thus enabling the protective panel 100 to be removed from the surface 108 without damage to the protective panel 100, and without leaving adhesive residue on the surface 108. The gel adhesive 104 is washable such that upon removal from the surface 108, the adhesive 104 can be washed, e.g., with water or soap solution, to remove debris. The gel adhesive 104 retains its adhesiveness (e.g., peel strength and shear) even after being washed such that the protective panel 100 can be reused after washing.

In some examples, the gel adhesive 104 is a polyurethane (PU) gel adhesive. In some examples, the gel adhesive 104 is an acrylic adhesive. In some examples, the gel adhesive 104 is a silicone adhesive. The gel adhesive 104 can be a material that has self-healing properties such that when an impact causes a dent in the adhesive, the adhesive will flow back into a substantially flat layer over time and temperature. The gel adhesive 104 is a thin layer, e.g., having a thickness in the range of between a few microns (e.g., 2 microns) and 550 microns or between 0.2 mm to 2.0 mm, e.g., about 1 mm or about 0.2 mm thick. The thickness of the gel adhesive 104 has a high uniformity, e.g., a thickness variation of between +/−0.05% and +/0 10%. In some examples, the gel adhesive 102 is an environmentally friendly adhesive, e.g., recyclable or compostable; a non-toxic adhesive as determined by contact or ingestion; or both.

The gel adhesive 104 has an adhesion to the protective film 102 at room temperature in the range of 0.02 to 0.7 N/25 mm, e.g., 0.1 to 0.5 N/25 mm, 0.2 to 0.4 N/25 mm, e.g., 0.02, 0.5, 0.1, 0.2, 0.25, 0.3, 0.4, 0.5, 0.6, or 0.7 N/25 mm. At elevated temperature, e.g., after heating to 80° C. for 30 minutes, the gel adhesive 104 has an adhesion to the protective film 102 in the range of 0.04 to 1.1 N/25 mm. In some examples, the gel adhesive 104 cannot be removed from the protective film 102 without damaging the gel adhesive, the protective film 102, or both.

The gel adhesive 104 is designed to maintain sufficient adhesion to the surface 108 in a range of temperatures across which the vehicle is expected to be operated, e.g., in a temperature range of between about −40° C. and about 220° C., e.g., between about −20° C. and about 180° C., e.g., between about −20° C. and about 120° C., or between about 15° C. and about 100° C. For instance, the gel adhesive 104 maintains a minimum adhesive force sufficient to adhere the protective panel 100 to the surface 108 within a temperature range of between about −40° C. and about 220° C. In a specific example, the gel adhesive has a hardness of O6-O50, a coefficient of friction of greater than 1.5, a tensile strength of greater than 0.6 MPa, and a tear strength of greater than 50 N/cm.

The adhesive force of a gel adhesive 104 can be tailored by adjusting the chemistry of the adhesive. For instance, the composition (e.g., base monomers, side groups, cross-linking, etc.) of the adhesive can be selected to obtain a desired adhesion. In a specific example, an acrylic adhesive can be designed with cross linkers to reduce peel strength and increase shear of the adhesive, properties which facilitate clean removal of the adhesive from the surface. In another specific example, the composition of the adhesive can be adjusted to give the adhesive a target glass transition temperature, which in turn provides a desired peel strength and shear for the adhesive. For instance, a glass transition temperature of between −30 to −60° C. generally correlates with a tacky adhesive with higher peel strength, while a glass transition temperature of between −30 and −10° C. generally correlates with higher shear for the adhesive.

In some examples, the gel adhesive 104 provides low-level adhesion to the surface 108. Low-level adhesion can be, e.g., peel values of about 200-600 grams when a 1-inch wide strip of the adhesive is peeled at 12 inches/minute at a 180-degree angle. In some examples, the gel adhesive 104 provides moderate adhesion to the surface 108, e.g., peel values of 800-1400 grams. In some examples, the gel adhesive 104 provides high adhesion to the surface 108, e.g., peel values of greater than 2000 grams. The gel adhesive 104 adheres to the protective film 104 more strongly than to the surface 108, meaning that the peel values between the gel adhesive 104 and the protective film 104 are higher than the peel values between the gel adhesive 104 and the surface 108. The level of adhesion of the gel adhesive 104 to the surface 108 can be selected based on a target use for the protective panel 100. For instance, use on a regular vehicle may warrant low- or medium-level adhesion, while use on a racecar or off-road vehicle may warrant high adhesion.

The gel adhesive 104 has high shear adhesion (cohesive strength), which is a measure of the cohesive strength and bond of the adhesive itself. High shear adhesives are important for removability, so that the adhesive does not split or transfer to the surface 108 upon removal of the protective panel 100 from the surface 108. Shear is measured in time for a given area and force. In some examples, the gel adhesive 104 has a shear of 40 hours when a 1-inch square area of adhesive is tested with a 1 kg weight.

In a specific example, the gel adhesive is a polyurethane (PU) gel adhesive that includes arrays of carbon nanotubes on its surface that form synthetic setae. The synthetic setae form nanostructures that interact with a surface by van der Waals interactions or other molecular interactions to cause a high macroscopic shear adhesion. These nanostructures enable the gel adhesive 104 to be reused, and washable.

A design 106 can optionally be included (e.g., affixed, etched, printed, etc.) in the protective film 102, e.g., on a surface of the protective film 102. In some implementations the design 106 can be a separate adhesive label that is adhered to a surface of the protective film 102. In some implementations, the design 106 can be etched or painted directly onto the protective film 102. The design 106 can provide aesthetic improvements to the protective panel 100. In some implementations, the design 106 can be of a contrasting color with the protective film 102, such that any penetrations or abrasions of the printed design that expose the protective film 102 will be readily visible.

In some implementations, the design 106 can include circuitry disposed on or embedded in the protective panel. For example, design 106 can include heating elements, which provide defrosting capabilities to the protective panel 100. In some implementations, the design 106 is formed of a luminescent paint, such as Lumilor®, or other illuminating paint. In some implementations, the design 106 can include a pattern of circuitry or lighting that performs under control of a controller such that the design lights up at designated times, e.g., when the vehicle is turned on, put into gear, traveling faster than a designated speed, etc. In some implementations, the design 106 can be a marketing or advertising design, e.g., so that the vehicle can be used as a travelling billboard; or an identification design, e.g., a decal or reusable sign to identify a company operating or sponsoring operation of the vehicle.

A protective panel can be shaped and dimensioned to fit on a particular surface. For instance, a protective panel to be used on a door of a vehicle can be designed specific to the shape and dimensions of the particular make and model of the vehicle. A protective panel that is specifically shaped and dimensioned to match its target surface provides thorough coverage of substantially all of the surface, enabling substantially all of the surface to be protected. In some examples, the protective panels are die cut from larger sheets into desired shapes. Because the size of the surface is often large (e.g., the door or hood of a vehicle), the intimate contact between the protective panel and the surface can create a suction effect that enhances the adhesion of the gel adhesive to the surface, thereby further contributing to the stability of the protective panel on the surface.

In some examples, the protective panels are flexible panels that can be curved to conform to a curved surface, e.g., to follow the contours of a surface of a vehicle. For instance, the protective panels can have varying thickness such that the portion of a panel that is designed to be curved is thinner than the portion that is designed to be flat, thus allowing there to be less stress on the bond between the panel and the surface in the curved region. In some examples, the protective panels are designed to be applied onto flat surfaces, and multiple, flat protective panels can be applied to a curved surface to approximate complete coverage of the curved surface.

FIG. 1B is a cross-sectional view of the protective panel 100 after removal from the surface 108 of FIG. 1A. To protect the gel adhesive 104, e.g., from dust, debris, or impact, a cover layer 110 is disposed over the gel adhesive 104 when the protective panel 100 is not in use. The cover layer 110 is a thin layer of material to which the adhesive 104 has low adhesion (peel strength) such that the cover layer 110 can be easily removed when a user is ready to reapply the panel 100 to a surface. In some examples, the protective panel 100 is stored flat. In some examples, the protective panel 100 is rolled into a roll for storage.

Figure 2A:
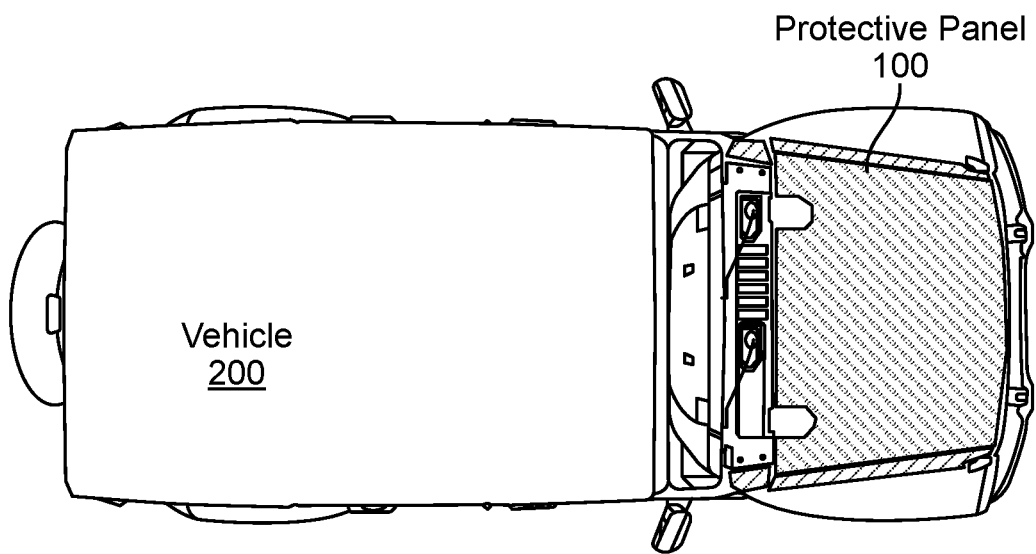
Figure 2B:
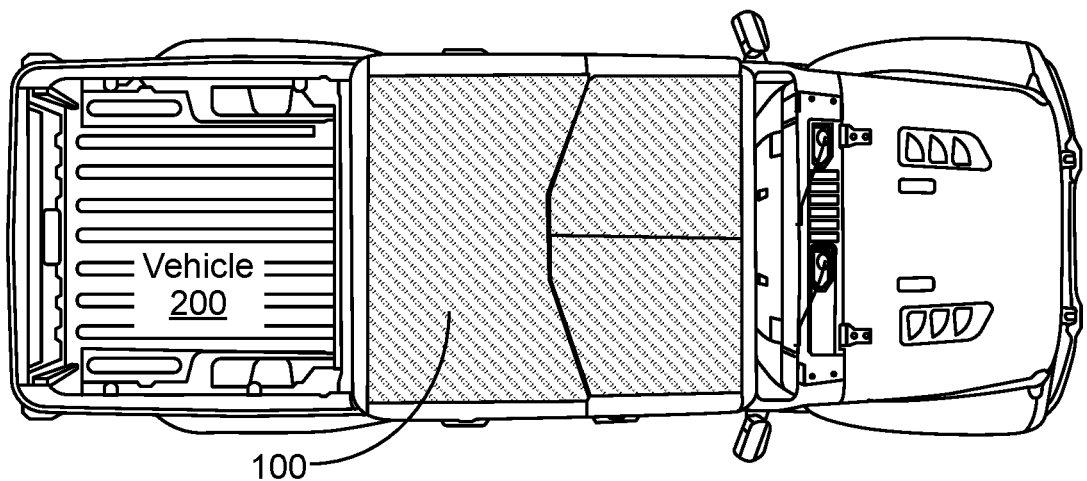
Figure 2C:
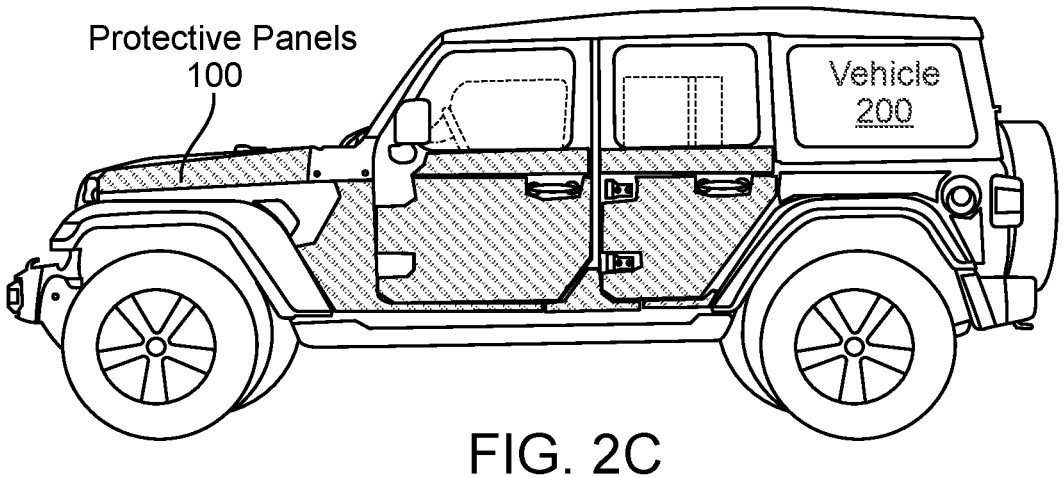

FIGS. 2A-2F illustrate an example use of protective panels on the exterior of a vehicle. Protective panels in FIGS. 2A-2F are indicated by hashed regions. FIG. 2A shows a top view of a vehicle 200, with a protective panel 100 installed on the hood. FIG. 2B shows protective panels 100 installed on the roof of the vehicle 200. FIG. 2C illustrates protective panels 100 installed on the sides and quarter panels of the vehicle 200. FIG. 2D shows protective panels 100 installed on the front grill, bumper, and around the front windshield of vehicle 200. FIG. 2E shows protective panels 200 installed on the rear panels and bumper of vehicle 200. FIG. 2F shows protective panels installed on a tailgate of vehicle 200. As shown in the figures, the protective panels are sized and dimensioned to match the surfaces on which they are installed.

Protective panels can be shaped and dimensioned to fit any surface of a vehicle for which protection is desired, for example, bumpers, fenders, a front grille, door handles and doors or sections thereof, a pillar, tail gate, etc. In some implementations, the protective panels can provide decorative and/or protective accents around lights, handles, or other features of the vehicle. In some implementations, the protective panels 100 are cut in a shape to match the vehicle panel, with recesses and holes to allow for placement around protruding features of the panel (e.g., keyholes, door handles, lights, etc.). In some implementations, the panels can be at least 0.15 by 0.5 meters in size.

Figure 3A:
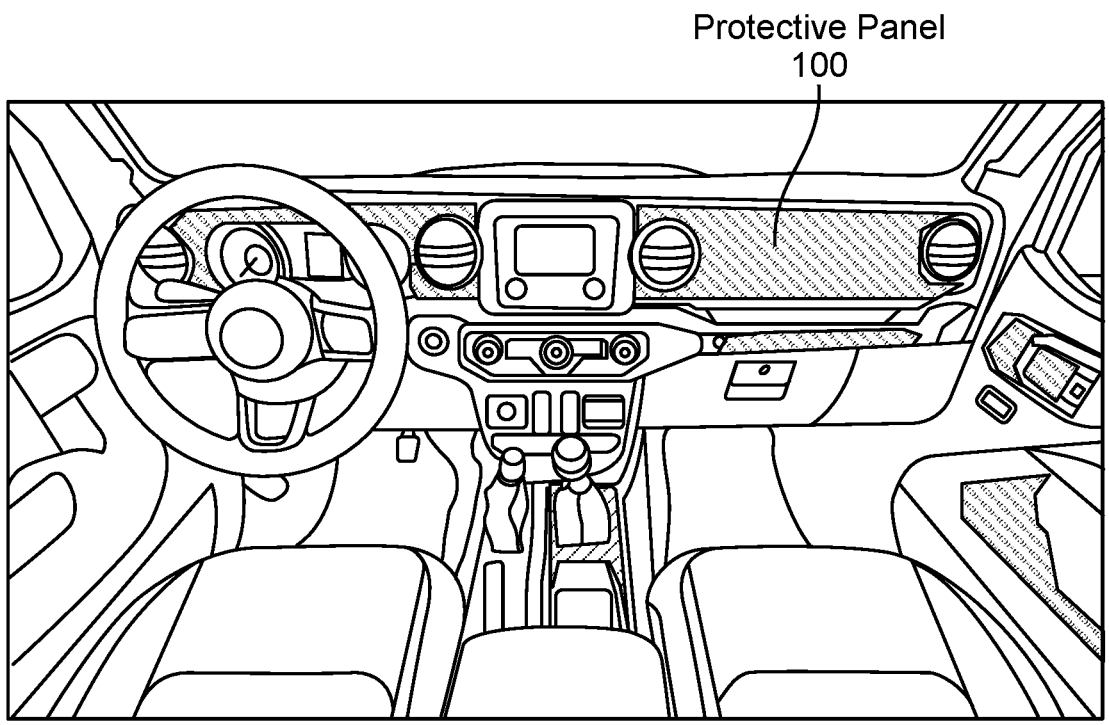
FIGS. 3A-3B illustrate protective panels on the interior of a vehicle.
Figure 3B:
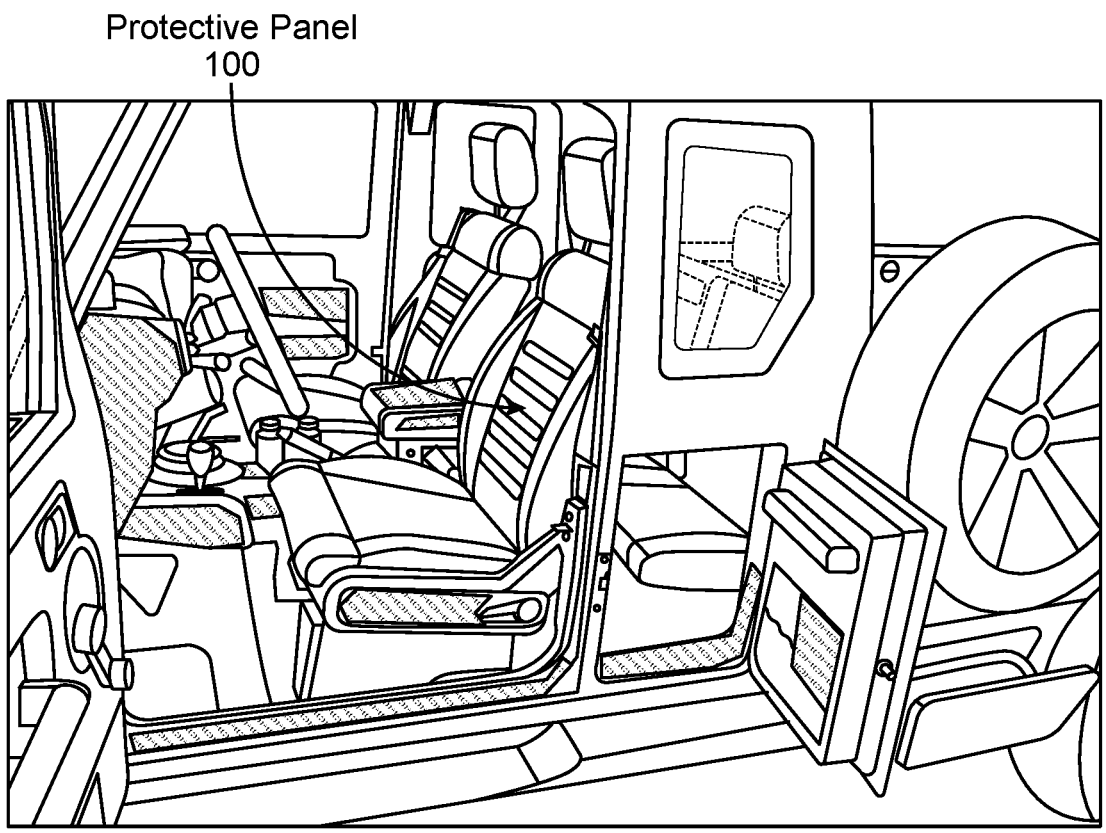

FIGS. 3A and 3B illustrated an example use of protective panels on the interior of a vehicle as indicated by the hashed regions. For example, protective panels 100 can be installed on the dashboard, door panels, trim panels, center console, glove compartment, or other locations as desired. In some implementations, the protective panels 100 can be used as a cosmetic accessory, changing the aesthetics (e.g., color, graphics, or texture) of the vehicle interior, in addition to or instead of providing protection for the interior surfaces. The protective panels 100 can be applied to various types of surfaces, including plastic, leather, fiberglass, metal, or other surface types.

In some implementations, protective panels 100 that are configured for interior use are thinner than panels configured for exterior use. For example, the interior panels can include a protective film that is only 0.15 mm thick, and is more flexible than the protective film used on exterior panels.

The protective panels in FIGS. 2A-2F and 3A-3B are somewhat rigid and are applied to flat or nearly-flat surfaces. In some examples, the protective panels are flexible and can be applied on curved surfaces or around corners. For instance, a single, flexible protective panel can be applied to portions of the body of a vehicle on both the front and sides of the vehicle.

The gel adhesive 104 is coated on one side of the protective film 102 using any suitable coating process. For instance, the gel adhesive can be coated by spray coating, knife over roll coating, slot die coating, reverse roll coating, extrusion coating, transfer coating, or another suitable coating process. The coating application technique can be selected based on the rheology of the adhesive material and the desired thickness of the adhesive layer.

In some implementations the gel adhesive is spray coated, e.g., the gel adhesive material is heated to a temperature at or above its melting point (e.g., to a temperature over 100□) and, in liquid form, sprayed onto the protective film 102. In some implementations, the gel adhesive is solution coated onto the protective film 104, e.g., the protective film 102 is partially or fully immersed in liquid gel adhesive. In some implementations, the gel adhesive is transfer coated, in which the gel adhesive material is applied to a release treated carrier and dried or cured thermally, and then laminated onto the protective film 102; when the carrier is removed, the gel adhesive remains adhered to the protective film. In some implementations, the gel adhesive is extrusion coated, in which a molten flow of resin at a temperature of between, e.g., 250-350° F., is applied to the protective film.

In some examples, the protective film 102 is pre-treated prior to the adhesive being coated onto the protective film. Pre-treatment can include web cleaning, in which the protective film passes through a cleaning apparatus, such as a brush and/or vacuum, to remove surface debris. Pre-treatment can include chemical pretreatments such as corona treatment, in which the protective film is exposed to a corona generated by an electrode to alter the surface chemistry (e.g., to raise the dyne level). In some examples, the coated protective film 102 is subject to a post-coating treatment, such as curing or annealing. For instance, if the gel adhesive is a cross-linked adhesive, the curing may involve a wait time of 24-48 hours before full performance is reached. Once coated (and cured, if appropriate), the protective film can be cut, e.g., die-cut, into desired shapes and dimensions.

For approaches to coating the protective film that rely on a liquid adhesive, the PU adhesive gel is heated to above a melting point of the adhesive material, e.g., at least 100□, at least 125□, at least 150□, or other temperature. In some implementations, the protective film is also heated prior to coating to reduce a temperature differential between the PU gel and the substrate.

In some implementations, the coating process is a roll-to-roll coating process in which a roll of the protective film is unwound, coated with the gel adhesive, and rewound. The pre-treatment can be performed as the roll is being unwound.

In some examples, the substrate (e.g., the protective film) is provided as large panels, e.g., square or rectangular panels of at least about 40 inches in width or 96 inches in width. The gel adhesive is coated onto the panels, and the panels are then cut into appropriate sizes and shapes to match the configuration of the target vehicle surface. In some examples, the panels are cut to the appropriate sizes and shapes before the coating process.

Figure 4:
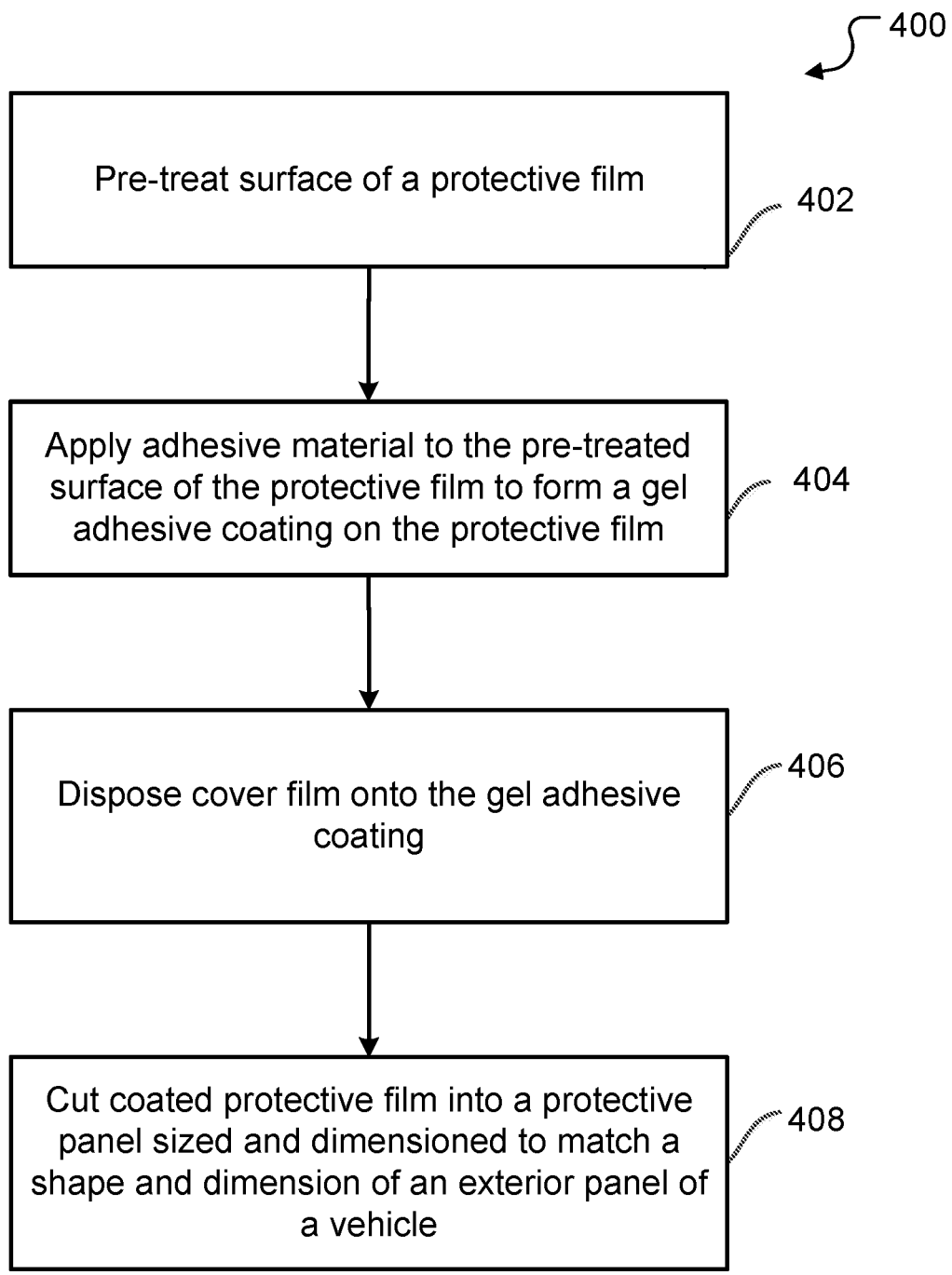
FIGS. 4 and 5 are flowcharts.

FIG. 4 is a flowchart describing an example method 400 for manufacturing a protective panel. A surface of the protective film is pre-treated (402) by cleaning the surface, corona treating the surface, or both. The protective film is configured to prevent damage to an exterior panel of a vehicle, e.g., the protective film has sufficient hardness, strength, or durability to protect an underlying surface to which it is adhered.

An adhesive material is applied to the pre-treated surface of the protective film to form a gel adhesive coating on the protective film (404). The gel adhesive coating has a shear adhesion that is higher than the peel force of the gel adhesive coating to the protective film. In addition, the gel adhesive coating is configured such that, when the protective panel is adhered to an exterior panel of a vehicle, the peel force of the gel adhesive coating to the protective film is higher than a peel force of the gel adhesive to the exterior panel of the vehicle. The adhesive material can be coated by, e.g., spray coating, dip coating, transfer coating, extrusion coating, or another suitable coating process. In some implementations, multiple sequential coats of PU gel adhesive are applied to the substrate. In some implementations, after the PU gel adhesive is applied to the protective film, it is cured via light illumination (e.g., ultraviolet, infrared, or visible light), or other stimulus (e.g., acoustic agitation, electromagnetic irradiation, etc.).

In some examples, once coating is complete, the gel adhesive coated protective film are allowed to cool to ambient temperature, creating a strong cohesion between the protective film and the gel adhesive coating. In some implementations, the gel adhesive coated protective film is actively cooled. For example, a fan can provide convective cooling. In some implementations, an air conditioning or refrigeration system is used for cooling.

A cover film is disposed onto the gel adhesive coating to protect the coating and to prevent the coating from adhering to other surfaces (406). The coated protective film is cut, e.g., by die cutting, to form a protective panel that is shaped and dimensioned to match a shape and dimension of the exterior panel of the vehicle (408).

Figure 5:
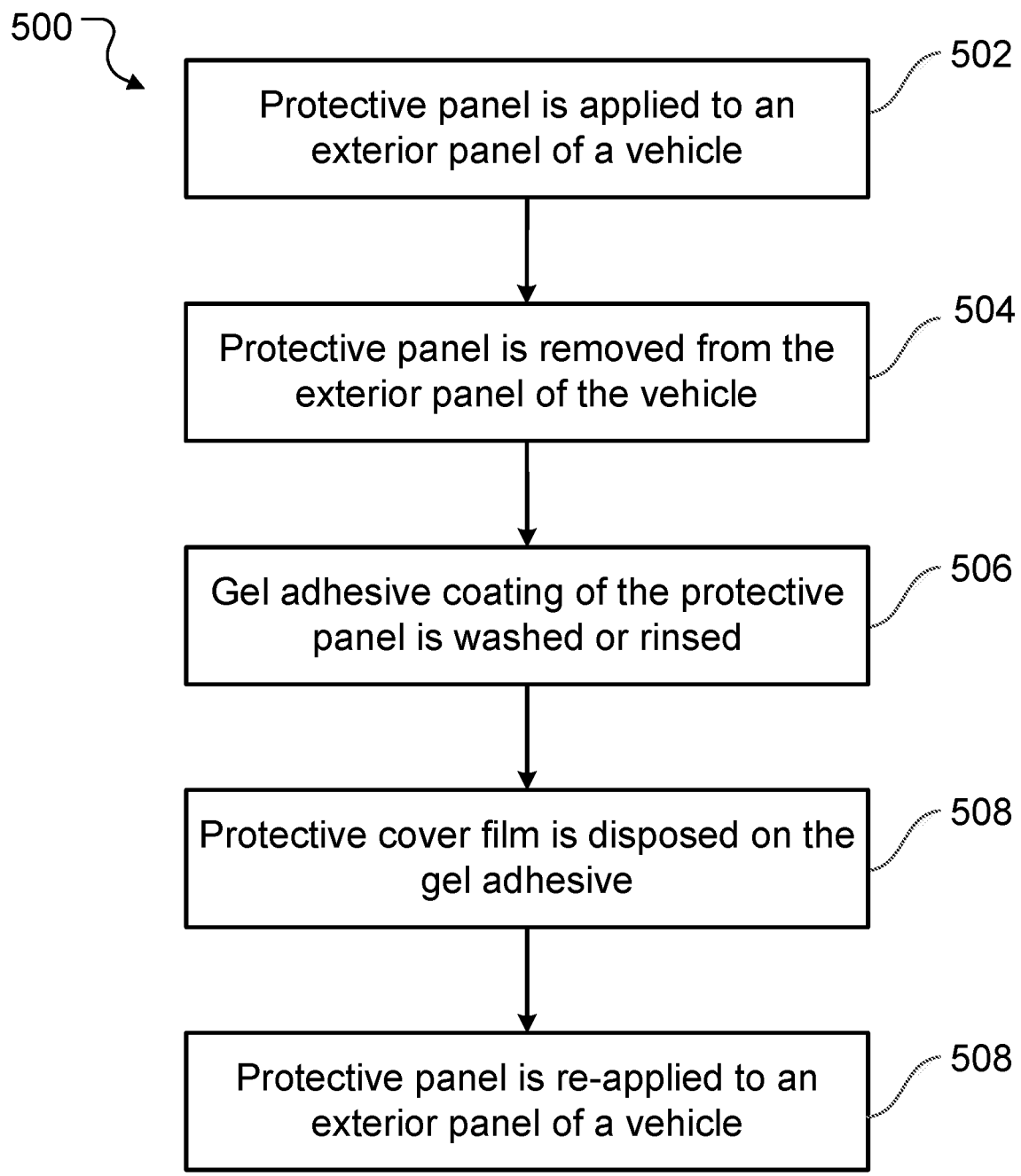

FIG. 5 is a flowchart describing a process 500 for using a protective panel for a vehicle. A protective panel is applied to an exterior panel of a vehicle by pressing the panel against the vehicle to adhere the gel adhesive coating to the panel of the vehicle (502). At a later point in time, which can be up to weeks or months after application, the protective panel is removed from the exterior panel of the vehicle (504). For instance, the protective panel is peeled off the exterior panel by application of a peel force sufficient to detach the gel adhesive from the exterior panel without damaging or destroying the gel adhesive and without detaching the gel adhesive from the protective film. While the PU adhesive gel used to affix the panel provides great lateral or shear force resistance, if lifted off the surface (e.g., peeled from one corner) it can readily be removed.

The protective panel is then washed or rinsed, e.g., with water or a soap solution (506). A rinse removes any dust or debris that may have adhered to the PU gel. When the gel adhesive includes synthetic setae, the rinse re-aligns the synthetic setae in the gel in order to enable it to re-adhere when reused.

A protective cover film (e.g., plastic sheet) is disposed on the gel adhesive after the protective panel is removed from the vehicle to keep the adhesive gel clean for storage (508), and the entire protective panel can be rolled, stored flat, or otherwise stored until its reuse is desired.

To reuse the protective panel, the cover film is removed from the gel adhesive and the protective panel is re-applied to the exterior panel of the vehicle (510) or to another exterior panel, e.g., a panel of similar shape and dimension. The protective panel can be reused multiple times, e.g., at least 50 times, at least 100 times, or at least 200 times, while still maintaining sufficient adhesion to the surface to be protected.

In some examples, the protective panel is removed periodically for cleaning, or is removed following a use that is likely to render the PU gel adhesive dirty, e.g., an off-road vehicle trip. In some examples, the protective panel can remain installed on the vehicle as long as the user is satisfied with the appearance of the protective panel, without interim cleaning of the PU gel adhesive.

Implementations have been described in detail with reference to the accompanying drawings. The foregoing detailed descriptions are provided to assist the reader in gaining a comprehensive understanding of the methods, devices, circuits, and/or systems described herein as well as modifications thereof. Accordingly, various modifications and equivalents of the methods, devices, circuits, and/or systems described herein will be apparent to those of ordinary skill in the art. Descriptions of well-known functions, steps, and constructions may be omitted for increased clarity and conciseness.

Furthermore, the terms used herein are intended to describe implementations and shall by no means be restrictive. Unless clearly used otherwise, expressions in a singular form include a meaning of plural form. An expression such as "comprising" or "including" is intended to designate a characteristic, a feature, a step, an operation, an element, a particular material, a part or combinations thereof, and shall not be construed to preclude any presence or possibility of one or more other characteristics, features, steps, operations, elements, parts or combinations thereof.

The invention claimed is:

1. A protective vehicle panel comprising:
    a protective film configured to prevent damage to an exterior panel of a vehicle; and
    a gel adhesive coating adhered to a first side of the protective film and configured to adhere to the exterior panel of the vehicle, wherein the gel adhesive has a higher peel force to the protective film than to the exterior panel of the vehicle, and wherein a shear adhesion of the gel adhesive is higher than the peel force of the gel adhesive to the protective film, and
    wherein the protective vehicle panel is shaped and dimensioned to match a shape and dimension of the exterior panel of the vehicle.

2. The protective panel of claim 1, wherein the gel adhesive coating comprises one or more of a polyurethane gel adhesive, an acrylic gel adhesive, a silicone gel adhesive.

3. The protective panel of claim 1, wherein the protective film comprises at least one of:
    polyethylene terephthalate (PET) resin;
    polycarbonate film (PC30);
    aluminum;
    steel;
    rubber; or
    carbon fiber.

4. The protective panel of claim 1, wherein the protective panel has length of at least 0.5 meters in a first dimension, and 0.15 meters in a second dimension, wherein the second dimension is perpendicular to the first dimension.

5. The protective panel of claim 1, comprising heating circuitry disposed on or embedded in the protective panel.

6. The protective panel of claim 1, comprising lighting circuitry disposed on or embedded in the protective panel.

7. The protective panel of claim 1, wherein the gel adhesive has a peel force to the exterior panel that is greater than about 200 grams.

8. The protective panel of claim 7, wherein the gel adhesive has a peel force to the exterior panel that is greater than about 800 grams.

9. The protective panel of claim 8, wherein the gel adhesive has a peel force to the exterior panel that is greater than about 2000 grams.

10. The protective panel of claim 7, wherein the gel adhesive maintains the peel force to the exterior panel in a temperature range of between −40° C. and about 220° C.

11. The protective panel of claim 1, wherein the gel adhesive has a shear adhesion of 40 hours when a 1-inch square area of adhesive is tested with a 1 kg weight.

12. The protective panel of claim 1, wherein the protective film has a thickness in the range of 0.2 to 1 mm, and wherein the gel adhesive coating has a thickness in the range of 2 microns and 550 microns.

13. The protective panel of claim 1 comprising:
a printed design on a second side of the protective film opposite the first side.

14. The protective panel of claim 12, wherein the printed design comprises luminescent paint.

15. A method of manufacturing a protective panel, the method comprising:
pre-treating a protective film by cleaning a surface of the protective film, corona treating the surface of the protective film, or both, the protective film being configured to prevent damage to an exterior panel of a vehicle;
applying an adhesive material to the pre-treated surface of the protective film to form a gel adhesive coating on the protective film, wherein the gel adhesive coating is configured to have a higher peel force to the protective film than to the exterior panel of the vehicle, and wherein a shear adhesion of the gel adhesive coating is higher than the peel force of the gel adhesive coating to the protective film;
disposing a cover film over the gel adhesive coating; and
cutting the protective film with the gel adhesive coating formed thereon into a protective panel shaped and dimensioned to match a shape and dimension of the exterior panel of the vehicle.

16. The method of claim 15, wherein applying the adhesive material to the surface of the protective film comprises spraying coating liquid adhesive material onto the surface of the protective film.

17. The method of claim 15, wherein applying the adhesive material to the surface of the protective film comprises transfer coating the gel adhesive coating onto the protective film from a release treated carrier substrate.

18. The method of claim 15, wherein applying the adhesive material to the surface of the protective film comprises extrusion coating the adhesive material onto the surface of the protective film.

19. A method for protecting an exterior panel of a vehicle comprising:
contacting a protective panel to the exterior panel to adhere the protective panel to the exterior panel, wherein the protective panel is shaped and dimensioned to match a shape and dimension of the exterior panel of the vehicle, the protective panel comprising:
a protective film protective film configured to prevent damage to the exterior panel of the vehicle; and
a gel adhesive coated on a side of the protective film and configured to adhere to the exterior panel of the vehicle, wherein the gel adhesive has a higher peel force to the protective film than to the exterior panel of the vehicle, and wherein a shear adhesion of the gel adhesive is higher than the peel force of the gel adhesive to the protective film.

20. The method of claim 19, comprising:
removing the protective panel from the vehicle;
washing the gel adhesive of the protective panel; and
disposing a cover film over the washed PU gel adhesive.

21. The method of claim 20, comprising:
removing the cover film from the gel adhesive; and
re-adhering the protective panel to the exterior panel of the vehicle.

* * * * *